Patented Apr. 13, 1937

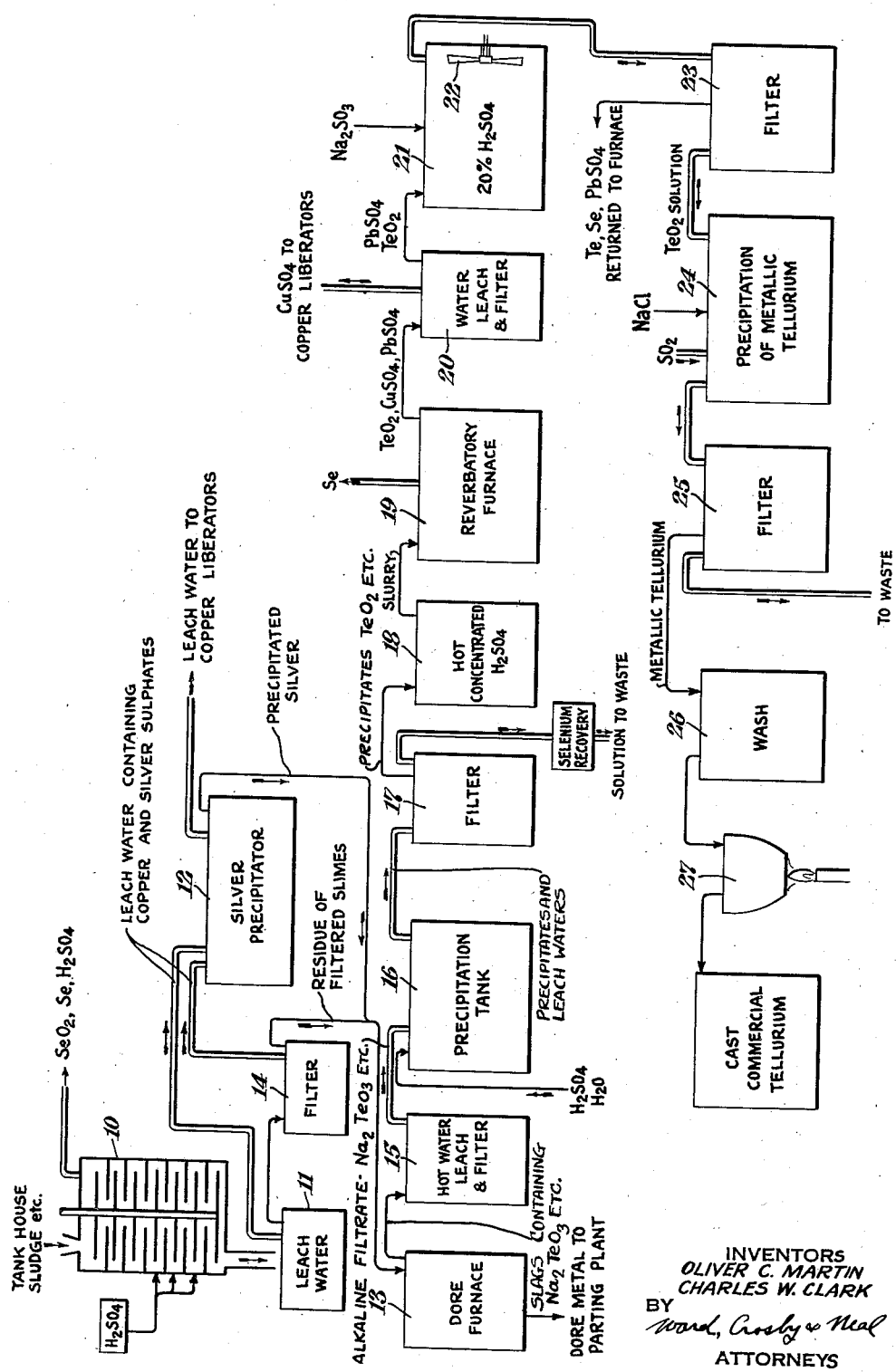

2,076,738

UNITED STATES PATENT OFFICE 2,076,738

RECOVERY OF TELLURIUM

Oliver C. Martin, Plainfield, N. J., and Charles W. Clark, Pointe aux Trembles, Quebec, Canada Application March 10, 1936, Serial No. 67,998

12 Claims. (Cl. 75—99)

This invention relates to a process for recovering tellurium and other materials from copper refinery sludges, as for example so-called "tank house" sludges or "anode slimes". The invention is more particularly directed to improvements and alternative process steps related to the same general subject matter as the invention of our co-pending application Ser. No. 711,622, filed February 17, 1934, now Patent #2,039,256, entitled "Processes of treating refinery sludges or slimes containing selenium and tellurium", the present invention in its preferred embodiment being directed principally to processes for recovery of the tellurium.

The objects of the invention include the provision of an efficient, economical and reliable process for recovering tellurium from sludges, slimes and slags or the like materials containing tellurium, and at the same time if desired, permitting the recovery of precious metals and other metals such as copper, lead and selenium.

Further and more specific objects, features and advantages will more clearly appear from the detailed description given below taken in connection with the accompanying drawing which comprise a flow sheet schematically illustrating by way of example one embodiment of apparatus which may be used in practicing the invention.

The invention consists in such novel combinations of methods, processes and process steps as may be shown and described in connection with the preferred embodiment of the invention herein disclosed.

In accordance with the process as disclosed in our said copending application, the raw sludges or slimes may be first treated as by filtering to remove excess electrolyte, and are then roasted for example, at 650° to 700° F. with additions of sulphuric acid. This step may be accomplished satisfactorily by continuously feeding the material substantially with the exclusion of air through a multiple hearth furnace as indicated at 10 in the drawing. This furnace is preferably muffle heated and the sulphuric acid may be sprayed on to the roasting material at several of the hearths and as more fully disclosed in our said prior application.

This sulphatizing roasting of the material in a muffle furnace converts the copper, silver and other selenides to the corresponding sulphates, the selenium being then liberated from the selenides and volatilized as selenium and selenium dioxide, which is passed out, together with some of the sulphuric acid, through the furnace flue. The furnace is preferably operated under a very slight draft derived from the gases and vapor formed in the furnace and withdrawn through an outlet at the top of the furnace as indicated. Thus substantially no flue dust is lost, as in the oxidizing roast of prior practice. Sufficient acid is used in the furnace to insure elimination of most of the selenium (in excess of 95%) during the roasting.

The selenium may be recovered from the flue gases in the manner disclosed in our said copending application.

The roasted slimes from the muffle furnace may be subjected to a water leach as at 11, which removes the larger part of the copper as copper sulphate, and some silver as silver sulphate, from the slimes. In order to remove the silver from the silver sulphate in the leach waters, such waters may be conducted to a precipitator 12 where the silver is precipitated from the liquors preferably by means of scrap copper. The precipitated silver may be charged directly into a Dore furnace 13. The leach liquors, after the silver is precipitated from them, may be sent to liberators (for example, electrolytic cells), where cathode copper may be deposited out according to the process steps more fully disclosed in our said copending application.

After the roasted slimes, which contain the tellurium content of the material, are water leached at 11, they may be filtered as at 14 and the residue of the filtered slimes may be passed with the precipitated silver to the Dore furnace 13.

The material thus charged into the Dore furnace may be treated in accordance with the usual Dore practice and the resulting Dore metal may be sent to a parting plant. However, since the major part of the selenium is eliminated at the start of the refining process, considerably less chemicals, a shorter time of treatment and a smaller Dore furnace will be required, as compared with the usual Dore practice, for a given quantity of Dore metal produced.

The process steps for recovering the tellurium from the Dore furnace slag will now be described. The slags produced by the fluxing of the precious metal slimes with soda ash or caustic soda, contain the tellurium in the form of sodium tellurite.

These slags are cooled or allowed to cool and then are preferably crushed to the extent necessary to form pieces of about one inch in diameter or less. The crushed slag may then be leached with hot water as at 15 so as to dissolve all of the soluble salts. The remaining solid material is then separated out as by filter or otherwise, and the filtrate which contains the tellurium, as sodium tellurite, may be conducted to a precipitation tank as at 16. Sufficient dilute sulphuric acid is mixed with the material in this tank to neutralize the alkaline filtrate and to cause the tellurium content to be precipitated as tellurium dioxide. The amount and concentration of the acid should be insufficinet to cause any substantial amount of the tellurium dioxide to be redissolved. With the tellurium dioxide, compounds of various other metals, such as copper, lead and any remaining selenium, will also be precipitated and it is therefore necessary to further treat the precipitate to extract the tellurium in a pure state.

Heretofore the usual method of treating such precipitate has been to dissolve the same in a solution of sodium hydroxide and reprecipitate with sulphuric acid, this procedure being repeated several times until a pure tellurium dioxide was produced. The pure tellurium dioxide was then mixed with some reducing agent such as flour, starch or charcoal, then heated in a crucible until molten and ready to be cast into bars of commercially pure tellurium. However, with this process as heretofore used, it was very difficult to efficiently remove all of the impurities from the tellurium and some wastage of other recoverable materials was involved.

According to our present invention, the precipitates and leach waters of the tank 16 may be conducted to a filter 17 or other apparatus for separating the precipitates from the leach waters. Solutions from this step may be acidified after filtration and gassed with SO₂ to recover any selenium present. The solution, after separation of selenium, may then be sent to waste. The precipitates including the tellurium dioxide, and any copper, lead and/or selenium present in precipitated forms may be then mixed with hot concentrated sulphuric acid as at 18 in sufficient amounts to provide a thick mud-like mixture, slurry or sludge.

The slurry may be then charged into a reverberatory furnace as at 19, heated to a temperature in the neighborhood of from 700° to 800° F., the mixture preferably remaining in the furnace until it is dry. The material should be roasted until all free sulphuric acid has been fumed off, otherwise some of the tellurium will be dissolved in the water leach. This removes most of the remaining troublesome amounts of selenium by volatilization. The selenium thus removed may be conducted to apparatus for recovering various purified forms of selenium, such for example as disclosed in our said copending application. Other materials remaining in the reverberatory furnace such as the copper and lead, are converted into their corresponding sulphates and these, together with the tellurium dioxide, are water leached and put through a filter or other separating means as at 20 whereby the copper, as copper sulphate, may be removed with the leach waters and conveyed to the copper liberators above mentioned.

The residue from this leach may now be leached as indicated at 21, for example with a 20% solution of sulphuric acid to dissolve the tellurium dioxide. Sodium sulphite may now be added to the tellurium bearing solution, the acid and the sodum sulphite being made sufficient to precipitate a very small amount of the tellurium as metallic tellurium. During this operation the solution may be agitated vigorously as by a suitable agitator 22 in order that the precipitated tellurium may cement out any traces of selenium that remain in the solution.

The solution may now be filtered as at 23 or otherwise treated to separate the small amount of precipitated tellurium, together with the selenium cemented out therewith and the lead sulphate which may if desired be returned to one or the other of the above described furnaces. The filtrate comprising tellurium dioxide solution may then be passed to a tank as at 24 into which is added a sufficient amount of salt to convert all of the sulphuric acid contained, to hydrochloric acid. Thereupon the hydrochloric acid tellurium solution may be gassed with sufficient sulphur dioxide to precipitate substantially all of the tellurium as metallic tellurium, which may be separated out as by a filter 25. The tellurium may be then washed as at 26, melted in a crucible as at 27, and thereafter cast into bars of commercial tellurium.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Process of recovering tellurium from materials of the nature of alkaline slags containing a tellurium compound together with other substances including copper, lead and/or selenium, which comprises water leaching said material, mixing sufficient dilute sulphuric acid with the resulting leach waters to form precipitates including an oxide of tellurium, separating the precipitates from the resulting liquid, applying hot concentrated sulphuric acid to the precipitates to form a mud-like mixture, heating said mixture to a temperature sufficient to drive off a substantial part of any selenium present, and to leave a dry mixture containing sulphates and the oxide of tellurium, removing the soluble sulphate by water leaching the latter mixture, then removing the oxide of tellurium by applying a liquid to dissolve the same, and applying reagent material to the oxide of tellurium solution to precipitate metallic tellurium.

2. Process of recovering tellurium from materials of the nature of alkaline slags containing a tellurium compound together with other substances including copper, lead and/or selenium, which comprises water leaching said material, mixing sufficient dilute sulphuric acid with the resulting leach waters to form precipitates including an oxide of tellurium, separating the precipitates from the resulting liquid, applying hot concentrated sulphuric acid to the precipitates to form a mud-like mixture, heating said mixture to a temperature sufficient to drive off a substantial part of any selenium present, and to leave a dry mixture containing sulphates and the oxide of tellurium, and subjecting said mixture to further treatment to obtain metallic tellurium therefrom.

3. Process of recovering tellurium from materials containing a tellurium compound together with other substances including copper, lead and/or selenium, which includes the steps of treating the material with concentrated sulphuric acid to form a thick mixture, heating said mixture to a temperature sufficient to drive off a substantial part of any selenium present, and to leave a dry mixture containing sulphates and an oxide of tellurium, removing the soluble sulphate by water leaching the latter mixture, removing the oxide of tellurium by applying a liquid to dissolve the same, and applying reducing agent to the oxide of tellurium solution to precipitate metallic tellurium.

4. Process of recovering tellurium from material containing an oxide of tellurium together with small amounts of selenium, which comprises applying to said material dilute sulphuric acid and sodium sulphite, agitating the resulting mixture, the quantities of said acid and sulphite being such as to precipitate a small amount of tellurium sufficient to cement out the selenium content of the material, then separating the precipitates including the selenium from said mixure, and subjecting said mixture to further treatment to obtain metallic tellurium therefrom.

5. Process of recovering tellurium from material containing an oxide of tellurium together with small amounts of sellenium, which comprises applying to said material dilute sulphuric acid and sodium sulphite, agitating the resulting mixture, whereby a small amount of tellurium is precipitated sufficient to cement out the selenium content of the material, then separating the precipitates and any other solids from said mixture, adding salt to the remaining liquid to form a hydrochloric acid solution, and adding a reducing agent to said solution to precipitate the metallic tellurium therefrom.

6. The process steps of recovering tellurium from a sulphuric acid solution containing an oxide of tellurium, which comprise adding to said solution sufficient salt to convert said acid to hydrochloric acid, and adding a reducing agent for precipitating metallic tellurium from the solution.

7. The process steps of recovering tellurium from a sulphuric acid solution containing an oxide of tellurium, which comprise adding to said solution sufficient salt to convert said acid to hydrochloric acid, and precipitating metallic tellurium from the solution by the use of sulphur dioxide gas.

8. Process of recovering tellurium from materials containing a tellurium compound together with other substances including copper, lead and/or selenium, which includes the steps of treating the material with sulphuric acid in a manner to remove the larger part of any selenium present, removing any soluble sulphates formed, then applying to the residue dilute sulphuric acid and sodium sulphite, agitating the resulting mixture, the quantities of said dilute acid and sulphite being such as to precipitate a small amount of tellurium sufficient to cement out the remaining selenium content of the material, then separating the precipitates including the latter selenium from the mixture, and adding reagent material to the remaining liquid for precipitating the metallic tellurium.

9. Process of recovering tellurium from materials containing tellurium and selenium which comprises subjecting the material while in a solution of sulphuric acid, to a treatment for removal of the selenium, then adding to said solution sufficient salt to convert said acid to hydrochloric acid, and adding a reducing agent for precipitating metallic tellurium.

10. Process of recovering tellurium from material containing an oxide of tellurium together with small amounts of selenium, which comprises applying to said material dilute sulphuric acid and a reducing agent, agitating the resulting mixture, the quantities of said acid and reducing agent being such as to precipitate a small amount of tellurium sufficient to cement out the selenium content of the material, then separating the precipitates including the selenium from said mixture, and subjecting said mixture to further treatment to obtain metallic tellurium therefrom.

11. Process of recovering tellurium from materials of the nature of alkaline slags containing a tellurium compound together with other substances including copper, lead and/or selenium, which comprises water leaching said material, mixing sufficient dilute sulphuric acid with the resulting leach waters to form precipitates including an oxide of tellurium, separating the precipitates from the resulting liquid, recovering any selenium present in said liquid, and subjecting the precipitates to further treatment to recover tellurium therefrom.

12. Process of recovering tellurium from materials of the nature of alkaline slags containing a tellurium compound together with other substances including copper, lead and/or selenium, which comprises water leaching said material, mixing sufficient dilute sulphuric acid with the resulting leach waters to form precipitates including an oxide of tellurium, separating the precipitates from the resulting liquid, whereby any substantial quantities of selenium present are eliminated with such liquid, heating the precipitates with sulphuric acid for the further elimination of selenium, and subjecting the remaining material to further treatment to recover tellurium therefrom.

OLIVER C. MARTIN.
CHARLES W. CLARK.